United States Patent
Yuan et al.

(10) Patent No.: US 9,305,226 B1
(45) Date of Patent: Apr. 5, 2016

(54) SEMANTIC BOOSTING RULES FOR IMPROVING TEXT RECOGNITION

(71) Applicant: Amazon Technologies, Inc., Reno, NV (US)

(72) Inventors: Chang Yuan, Seattle, WA (US); Geoffrey Scott Heller, Seattle, WA (US); Louis LeRoi LeGrand, III, Seattle, WA (US); Daniel Bibireata, Seattle, WA (US); Neil Cooper, Redmond, WA (US); Laura Varnum Finney, Seattle, WA (US); Saurabh Verma, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 27 days.

(21) Appl. No.: 13/893,175

(22) Filed: May 13, 2013

(51) Int. Cl.
G06K 9/18 (2006.01)

(52) U.S. Cl.
CPC ........................................ *G06K 9/18* (2013.01)

(58) Field of Classification Search
CPC . G06F 3/0317; G06F 3/03545; G06F 3/1204; G06F 3/1265; G06F 21/608; G06F 2203/0384; G06F 2221/2153; G06F 3/03546; G06F 3/038; G06F 3/0386; G06F 3/04883; G06F 3/1284; G06F 9/543; G06F 17/243
USPC ................. 382/182; 705/14.56; 717/106, 142
See application file for complete search history.

(56) References Cited

U.S. PATENT DOCUMENTS

| 2006/0262910 A1* | 11/2006 | Molnar et al. ............ 379/88.17 |
| 2014/0006158 A1* | 1/2014 | Cooper ....................... 705/14.56 |
| 2014/0089891 A1* | 3/2014 | Reyes Lozano et al. ...... 717/106 |

\* cited by examiner

*Primary Examiner* — Manuchehr Rahmjoo
(74) *Attorney, Agent, or Firm* — Novak Druce Connolly Bove + Quigg LLP (57) ABSTRACT

The accuracy of a text recognition process can be improved using a set of semantic boosting rules, as may be contained in a sequence or other such arrangement. When text is output from a text recognition process, that text can have alternatives and confidence values for different characters or portions of the string. In order to improve the accuracy, this data can be processed using the organized rules, where rules are applied as long as any preconditions for that rule are satisfied, and each rule has the ability to modify the confidence values or modify one or more of the alternatives. When a result it produced with a minimum confidence level, or all applicable rules have been applied, the result can be provided as a refined text output of the recognition process.

8 Claims, 10 Drawing Sheets

SEMANTIC BOOSTING RULES FOR IMPROVING TEXT RECOGNITION

BACKGROUND

Users are increasingly utilizing electronic devices to obtain various types of information. For example, a user wanting to obtain information about a book can capture an image of the cover of the book and upload that image to a book identification service for analysis. In many cases, the text in the image will correspond to "actionable" text, such as phone numbers, email addresses, or uniform resource locator (URL), that the user can use to access information or perform a function, such as to initiate a call or access a Web site. As known, optical character recognition (OCR) and other text recognition algorithms are not perfect when recognizing text, such that the actual "text" recognized might not accurately reflect the text that was captured in the image. While these errors can be somewhat frustrating for users, the errors can be especially frustrating when the erroneously recognized text is actionable text, which can result in a user dialing the wrong number, emailing the wrong person, attempting to access a Web address that does not exist, or perform another such action.

BRIEF DESCRIPTION OF THE DRAWINGS

Various embodiments in accordance with the present disclosure will be described with reference to the drawings, in which:

FIGS. 1 (a) and 1(b) illustrates an example environment in which aspects of the various embodiments can be that can be utilized;

DETAILED DESCRIPTION

Systems and methods in accordance with various embodiments of the present disclosure overcome one or more of the above-referenced and other deficiencies in conventional approaches to recognizing text in an image or video using an electronic device. In particular, various embodiments utilize a set of one or more semantic boosting rules to attempt to improve the accuracy of the text recognition process and correct potential semantic errors in the resulting text string. A set of semantic boosting rules can be determined, where each semantic boosting rule can be used to refine and/or update the confidence in various options for portions of a string of text. As an example, a string of text might have high confidence in all but one or two characters, and there might be relative confidences provided for various options for those characters. One possible boosting rule would look for patterns in the text, such as whether the text appears to match a URL, a phone number, or an email address, and will update the confidences so as to produce a valid output for that particular pattern. Another boosting rule might look at one or more data sources to attempt to locate entries for each of the options, and update the confidence values based on the located occurrences of each option. Similarly, another boosting rule can perform cross-referencing with respect to other text recognized from the image. For example, if a person's name or email address is captured in the image, and it appears that a URL is also in the image, the boosting rule can cause one or more sources to be checked to locate the name or email address, and attempt to determine whether the correct URL is associated with that name or email address in any of those sources. Various other boosting rules can be selected as well.

As each of these semantic boosting rules can have different levels of accuracy, a training process can be used to determine the order in which to apply the rules, the weight to give to each rule, or other such factors. In some embodiments, a rule decision tree can be created for processing recognized text, where each node of the tree corresponds to one of the boosting rules. As at least some of the rules might apply only to certain situations, or might be more accurate in certain situations, one or more preconditions can be determined that indicate whether to apply the rule to a given instance of text. Once such a tree is generated and refined, it can be used to process text and produce improved results based on the refined confidence values. Interaction of the user with the resulting text, such as whether the user accepted or corrected the text, can be fed back into the refinement or optimization process in order to refine the decision tree, update the confidences or preconditions for each rule, etc.

Various other functions and advantages are described and suggested below as may be provided in accordance with the various embodiments.

Figure 1A:
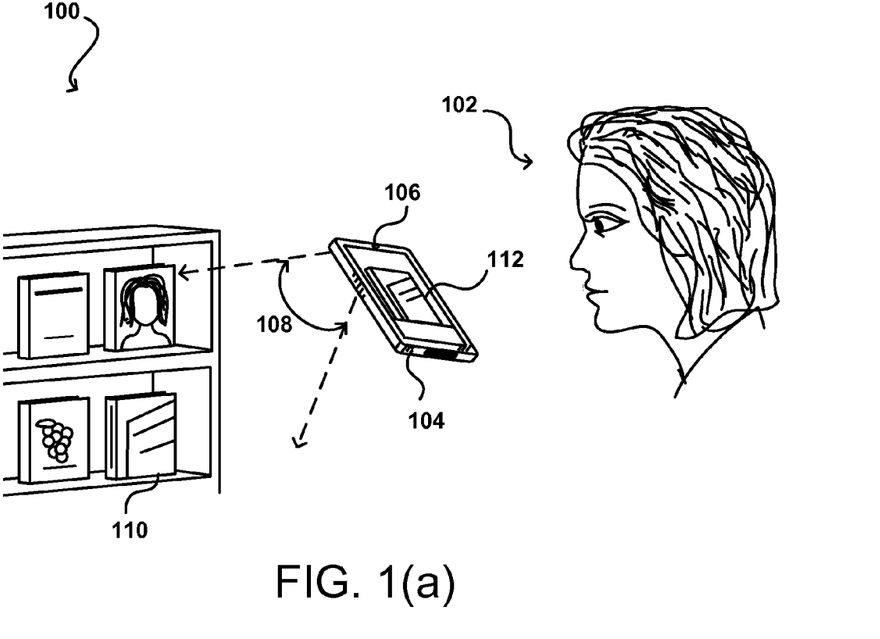

FIG. 1 illustrates an example environment 100 in which aspects of the various embodiments can be implemented. In this example, a user 102 is in a store that sells books, and is interested in obtaining information about a book 110 of interest. Using an appropriate application executing on a computing device 104, the user is able to obtain an image of the book 110 by positioning the computing device such that the book is within a field of view 108 of at least one camera 106 of the computing device. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among others.

In this example, a camera 106 on the device 104 can capture image information including the book 110 of interest, and at least a portion of the image can be displayed on a display screen 112 of the computing device. At least a portion of the image information can be analyzed and, upon a match being located, identifying information can be displayed back to the user via the display screen 112 of the computing device 104. The portion of the image to be analyzed can be indicated manually, such as by a user pointing to the book on the screen or drawing a bounding box around the book. In other embodiments, one or more image analysis algorithms can attempt to automatically locate one or more objects in an image. In some embodiments, a user can manually cause image information to be analyzed, while in other embodiments the image information can be analyzed automatically, either on the device or by transferring image data to a remote system or service as discussed later herein.

Figure 1B:
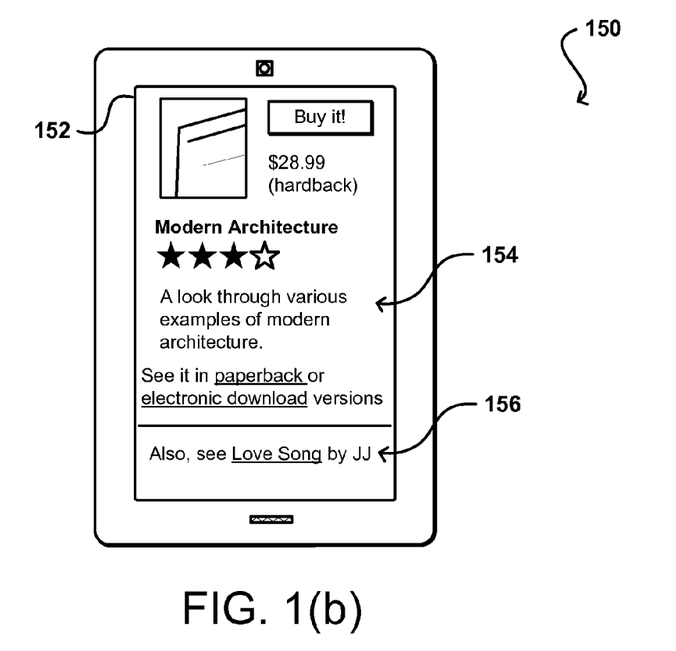

FIG. 1(b) illustrates an example of a type of information 154 that could be displayed to the user via a display screen 152 of a computing device 150 in accordance with various embodiments. In this example, the image captured by the user has been analyzed and related information 154 is displayed on the screen. The "related" information can be retrieved from one or more data sources, and can include any information related to an object, item, product, or other element that is matched (within at least a level of confidence) to the image data using, for example, a text recognition algorithm, such as an optical character recognition (OCR) or character recognition algorithm, to recognize one or more strings of text in the region of interest in the image. The type of information displayed (or otherwise conveyed) can depend at least in part upon the type of text recognized, as well as the type of content located or matched, among other such information.

Figure 2A:
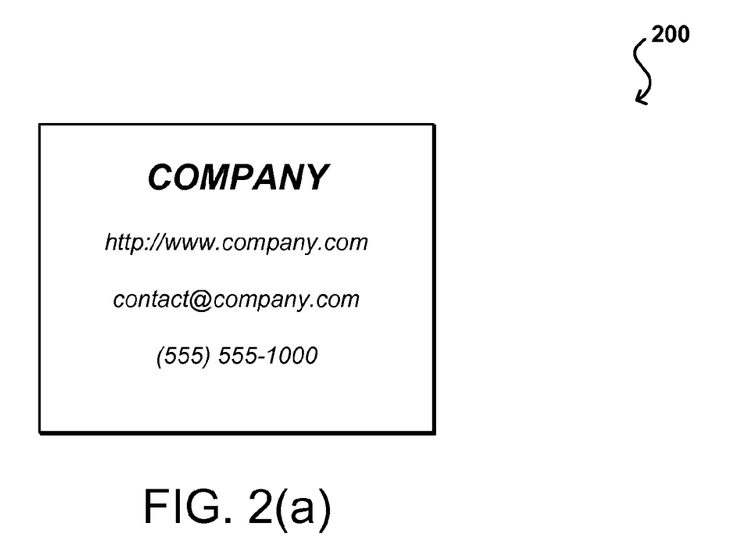
FIGS. 2(a) and 2(b) illustrate an example of a set of related text that can be captured in an image, and an example result of text that could be recognized from that image.
Figure 2B:
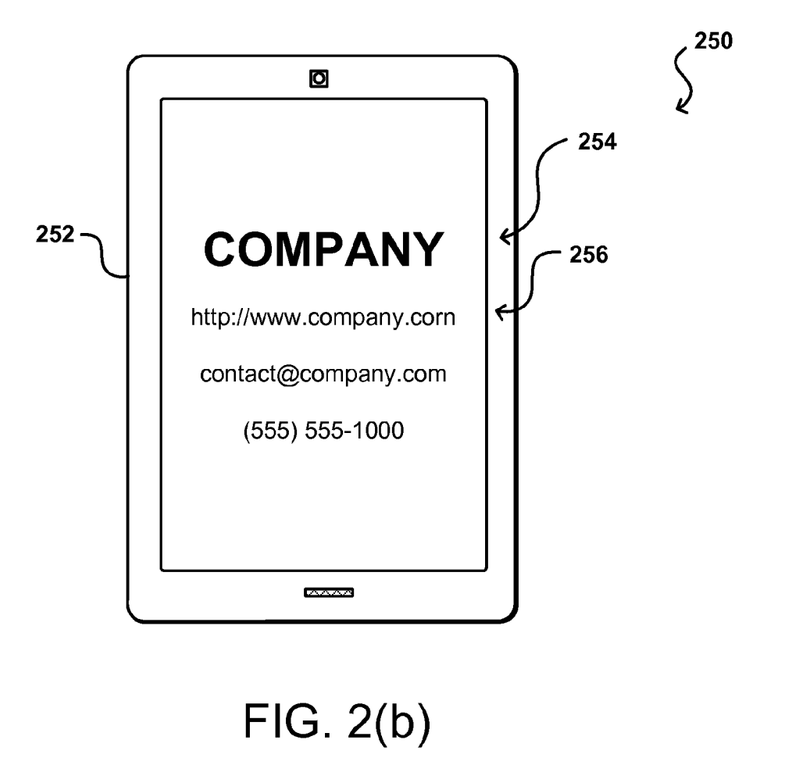

Other types of information might be captured in such an image as well. For example, FIG. 2(a) illustrates an example group of text 200 that might be captured by a camera of a computing device in accordance with various embodiments. This group of text could be displayed on a business card, billboard, or other such location, as the text contains information such as a company name, URL, email address, and phone number. A computing device 250 capturing this information can analyze the text using at least one OCR process, for example, and can display the recognized text 254 (as separate strings or together) on a display 252 of the device, as illustrated in FIG. 2(b). As can be seen, however, the URL 256 displayed does not match the URL in FIG. 2(a), as there was an inaccurate result for that string of text produced by the OCR process. The error could have been a result of any of a number of different factors as known for such processes, such as the resolution of the image, the lighting conditions, an amount of blur, the inherent accuracy of the OCR process, etc. The error in recognizing the text can be frustrating for the user, as the user might want to refer to that information later, and in some cases might not be able to determine the correct string based on the string that was recognized.

In the example of FIG. 2(b), the text that was incorrectly recognized corresponds to what is referred to herein as an instance of "actionable text." The URL is determined to be "actionable" text as a URL is something that can be presented to a user that, upon being selected by the user, causes the computing device 250 to perform a specific action, in this case submitting a request for content from that address to display (or otherwise utilize) on the computing device. If, through the recognition process, the text string is identified as a URL, the computing device can cause the URL to be displayed as a selectable hyperlink, for example, such that the user can select the hyperlink to visit the corresponding Website. When the text is incorrectly recognized, however, the user selecting the hyperlink can cause a browser or other application on the device to attempt to request content from an incorrect address, which can result in the wrong site being displayed or, in some cases, an error being returned indicating that there is no content associated with that address. Such an experience can be frustrating for a user, particularly if the user is no longer near the string of text that the user captured to obtain that URL information. It should be understood, however, that similar frustration and issues can arise with text other than actionable text as well.

Accordingly, systems and methods in accordance with various embodiments can attempt to optimize the recognition process and/or refine the results in order to improve the accuracy of recognized text. In at least some embodiments, the results of an OCR engine or other text recognition process can be run through a refinement process in order to attempt to refine the confidence values of one or more portions of the text, such that the result will more likely correspond to the text in the image.

Figure 3A:
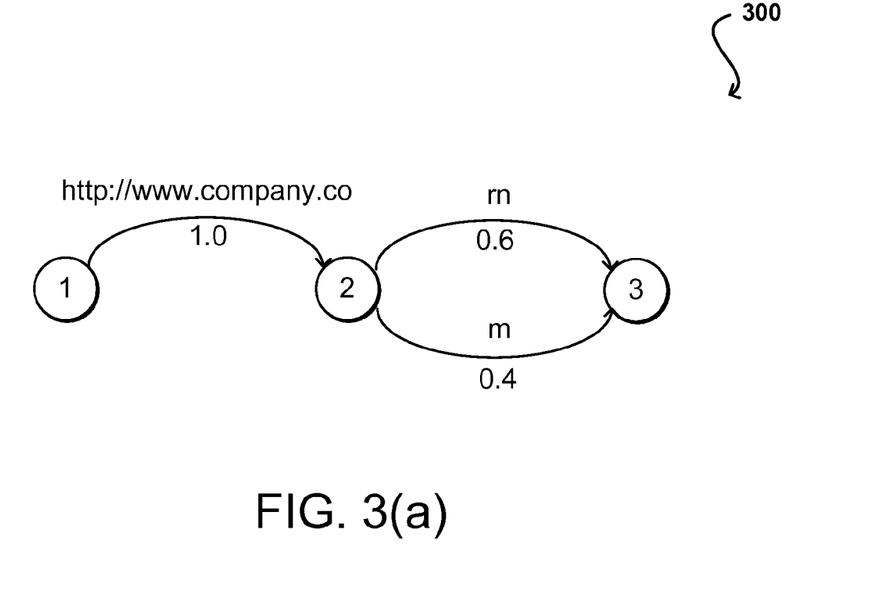
FIGS. 3(a) and 3(b) illustrate example bubble graphs illustrating a graph that might be produced using data from an OCR engine and a refined bubble graph produced after processing using an approach in accordance with the various embodiments.

FIG. 3(a) illustrates a bubble graph 300 as a way of viewing possibilities for text alternatives that can be returned from an OCR engine in accordance with various embodiments. In this example, the text string corresponding to the URL from FIG. 2(b) is analyzed. The OCR engine is confident in the first portion of the string corresponding to "www.company.co". Thus, in the bubble graph, that portion of the string is shown to span from the beginning, or first node ("1"), of the bubble graph to the first location, node 2, where there is some uncertainty in the match. While the confidence in this portion is listed as 1.0, as the confidence values are normalized to run from 0 to 1, it should be understood that there can be some minimum confidence value, such as 0.9, above which the OCR process can determine the results to be sufficiently confident. From node 2 to the end of the string, represented by node 3 in this example, the OCR engine has produced two relatively likely options, namely "rn" and "m". Each of these options has a corresponding confidence value, namely 0.6 and 0.4 respectively, and is shown using a distinct path between nodes 2 and 3. If the software simply takes the highest confidence value from the OCR engine, the text provided will be incorrect. It thus can be desirable to attempt to refine the confidence values.

Figure 3B:
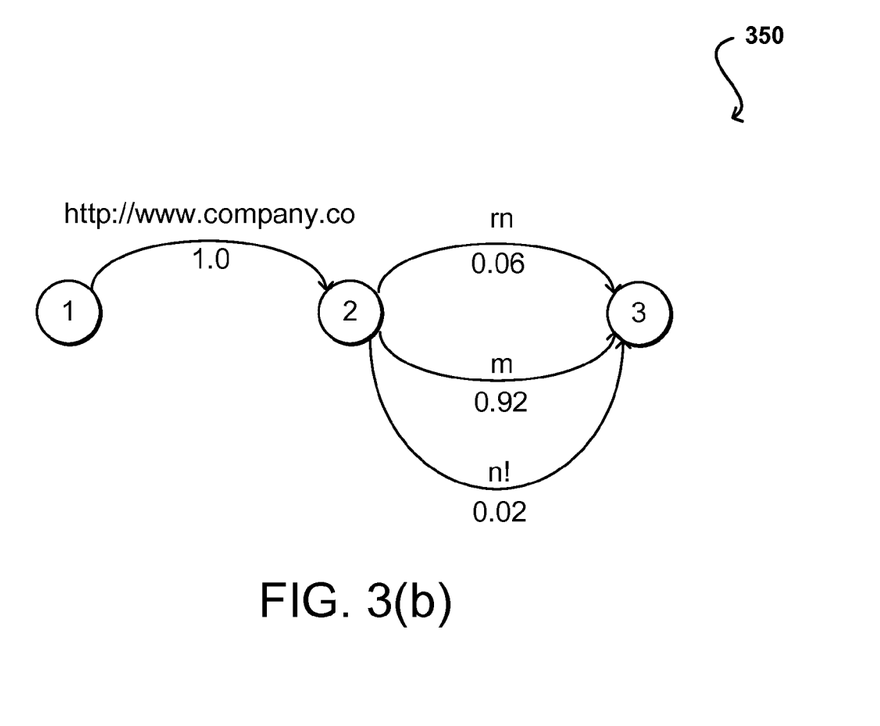

There are various things that can be done to attempt to improve the accuracy of the recognized text. In many embodiments, one or more semantic boosting rules are used to attempt to improve the accuracy. As an example, a boosting rule might look at text to attempt to determine whether the recognized text corresponds to a URL, and a result of finding the expected pattern of a URL can indicate that ".com" is a much more likely end portion than ".com". Similarly, a semantic boosting rule might cause a quick lookup of URLs to be performed that indicates "company.com" is a common domain and "company.com" is uncommon or does not exist, then that can be used to adjust the confidence in each of the options. Further, a boosting rule can look at the other recognized text to attempt to cross-reference the URL, then the correct URL can be located and compared to the options to either select or replace one or more of the options. For example, the company name or phone number might be able to be used to lookup contact information for the company, which might include the URL. Other approaches or boosting rules can be used as well, such as to attempt to improve the accuracy based at least in part upon a current context, behavior information for the current user or other users, proximity or location data, etc. Any of this information can be used with one or more semantic boosting rules to refine the relative confidences, which might result in an updated bubble graph 350 as illustrated in the example of FIG. 3(b). In the updated bubble graph, the option "rn" has had its confidence updated to 0.92 as a result of being processed with a semantic boosting rule that might have recognized the text as being a URL. Since the updated confidence score exceeds the minimum confidence threshold, that option is able to be selected with confidence to complete the text string. As illustrated, the option "rn" has a much lower confidence as a result of the refinement. It should be pointed out that the refinement process might add or delete options, as illustrated by the additional option of "n!", and there can be more or fewer nodes in the bubble graph as well as a result of the refinement in accordance with various embodiments.

It should be understood, however, that the refinement process can adjust confidence values, but will not necessarily end up with confidence values that exceed the minimum confidence threshold. In such cases, the process might still select the option(s) with the highest confidence at each node of the bubble graph. Further, while bubble graphs are used for illustration it should be understood that any appropriate technique can be used to track the locations in a text string where options are available based on the recognition process, as well as the relative confidences for each of those options.

Figure 4A:
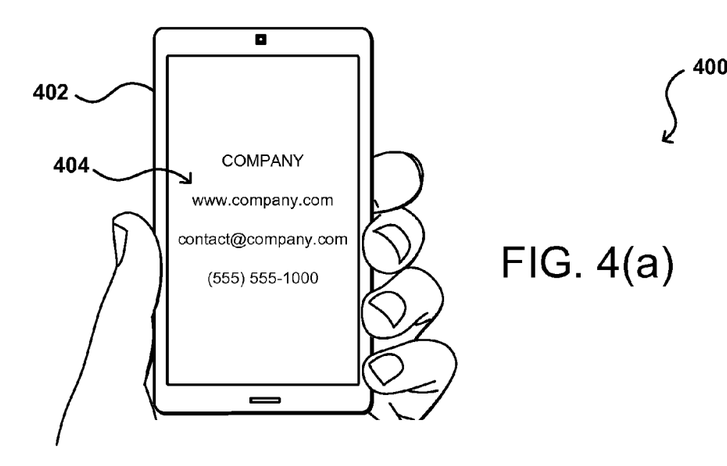
FIGS. 4(a), 4(b), and 4(c) illustrate an example wherein corrected actionable text is displayed to the user, enabling the user to select an instance of the actionable text in order to perform an associated function in accordance with various embodiments.
Figure 4B:
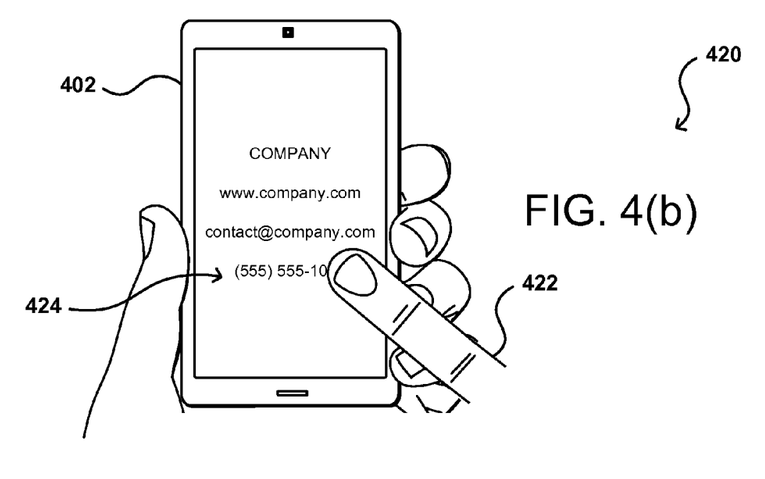
Figure 4C:
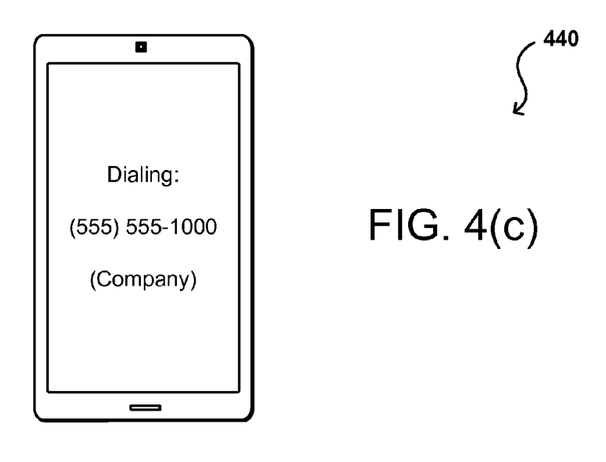

FIG. 4(a) illustrates an example 400 of the information 404 displayed on a display of a computing device 402 after refining the text using a process such as that discussed above. As illustrated, the URL has been properly recognized and is displayed on the device as actionable text, in this case a selectable hyperlink. Other actionable text is displayed as well, such as the email address and the phone number, each of which can be selected to cause a corresponding action to occur. For example, selecting the email address can cause an email application on the device to generate a new message directed to the email address. Similarly, as indicated in the example 420 of FIG. 4(b), the user can use a finger 422 or other mechanism to select the phone number 424 string on the display. The selection of the phone number can cause a phone or dialer application to be launched or activated, for example, and the phone number dialed as indicated in the example 440 of FIG. 4(c). Various other actions can be taken as well, as may be appropriate for different types of text. As mentioned, non-actionable text such as the company name can be refined as well using approaches discussed and suggested herein.

Figure 5:
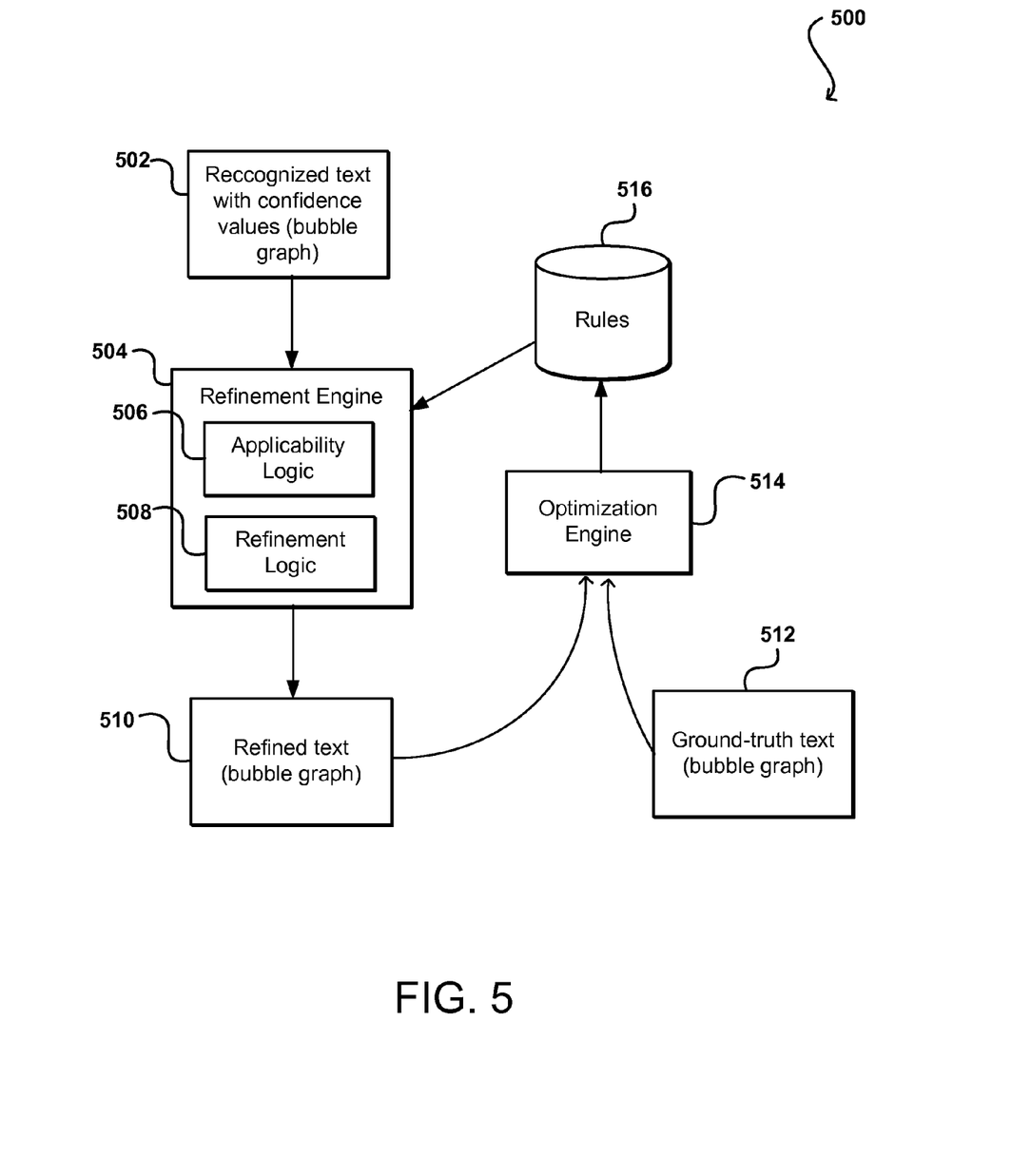
FIG. 5 illustrated an example set of components for use in refining text and/or bubble graphs that can be utilized in accordance with various embodiments.

FIG. 5 illustrates an example set of components 500 that can be used to refine recognized text strings and optimize rule sets, decision tree, or other such aspects within the scope of the various embodiments. In this example, a set of what are referred to herein as "ground-truth" text data 512, as may include text bubble graphs, can be provided. The ground truth data can include known text and the bubble graphs for each that are produced by an OCR engine or other text recognition process. The example also includes a set of rules 516, as may be stored in a data store or other such location. Each of these rules is capable of being applied to a string of text, bubble graph, or other such result to attempt to refine the confidences and/or other aspects of the recognized text. In this example, as part of an offline training process, the ground-truth text data and at least an initial set of rules can be fed into an optimization engine 514 or other such component. The optimization engine 514 can take each of the rules in the rule set and test those rules against the ground-truth text data to determine the relative performance of the rule, to provide an overall performance score, or other such metric, as well as potentially the relative performance scores for certain types of data. For example, a pattern recognition rule might work well on certain types of actionable data (e.g., a link, an address, a brand name, a point of interest, a trademark, a serial number, etc.) but not as well on long strings of prose, etc. At least some of these factors then can be stored as one or more "pre-conditions" for applying that particular rule to a string of text. The optimization can then select and/or sort rules based on relative performance scores, pre-conditions, and other such information. The optimization engine can also test groups of rules, either using random selections or by building and refining decision trees structured using the performance scores and other information.

Once the optimization engine has arrived at one or more decision trees, ordered sets of rules, or other such grouping, that set of rules can be provided to a component such as a refinement engine 504. The refinement engine 504, as well as the optimization engine 514, can each take the form of software and/or hardware, which can be located on and/or remote with respect to a computing device in accordance with various embodiments. The refinement engine 504 can receive recognized text data 502, as may be provided by an OCR engine after analyzing an obtain image containing one or more text regions. The refinement engine can include, for example, refinement logic 508 that enables the refinement engine to utilize the rule set(s) provided by the optimization engine and apply the rules to the text to attempt to improve the accuracy of the recognized text. The logic can cause the rules to be applied in order, for example, and can analyze the relative confidences at least level to determine whether to continue processing. For example, in some embodiments all rules in a decision tree will be applied to attempt to provide the most balanced result. In other embodiments, if a confidence reaches or exceeds a determined minimum value, the refinement logic might accept that result as the correct result and discontinue processing using the rules, in order to reduce the time and processing capacity needed to arrive at the result.

As illustrated, the refinement engine 504 can also include applicability logic 506 that can attempt to determine whether any pre-conditions for any of the rules to be applied are satisfied by the recognized text. If so, that rule can be used to process and/or refine the text. If not, the applicability logic might determine to not apply that rule and skip to the next rule in the tree, ordered set, etc. In some cases, these rules might only be applied if further refinement is warranted due to low confidence scores or other such metrics.

Once a final result is produced, such as when a minimum confidence has been reached for all nodes or paths, or when all applicable rules have been applied, the refined text and/or bubble graph 510 can be provided as the recognized text, which then can be presented to the user or otherwise processed or acted on, as appropriate. If the text is recognized as actionable text, the corresponding options can be provided as discussed elsewhere herein. The refined text can also be fed back into the optimization engine 514, in order to further refine the decision trees, rule sets, etc. Further, interactions of the user with the refined text 510 can also be recorded and used with the optimization engine to, for example, update a decision tree or rule set. For example, if the user selects one or the actionable text items, then that information is indicative that the refined result was correct and can be used to update the performance values for the rules, tree, etc. Similarly, if the user was detected to have corrected one of the refined text instances, that information, as well as the corrected text, can be used to adjust the values and/or selection as well.

Figure 6:
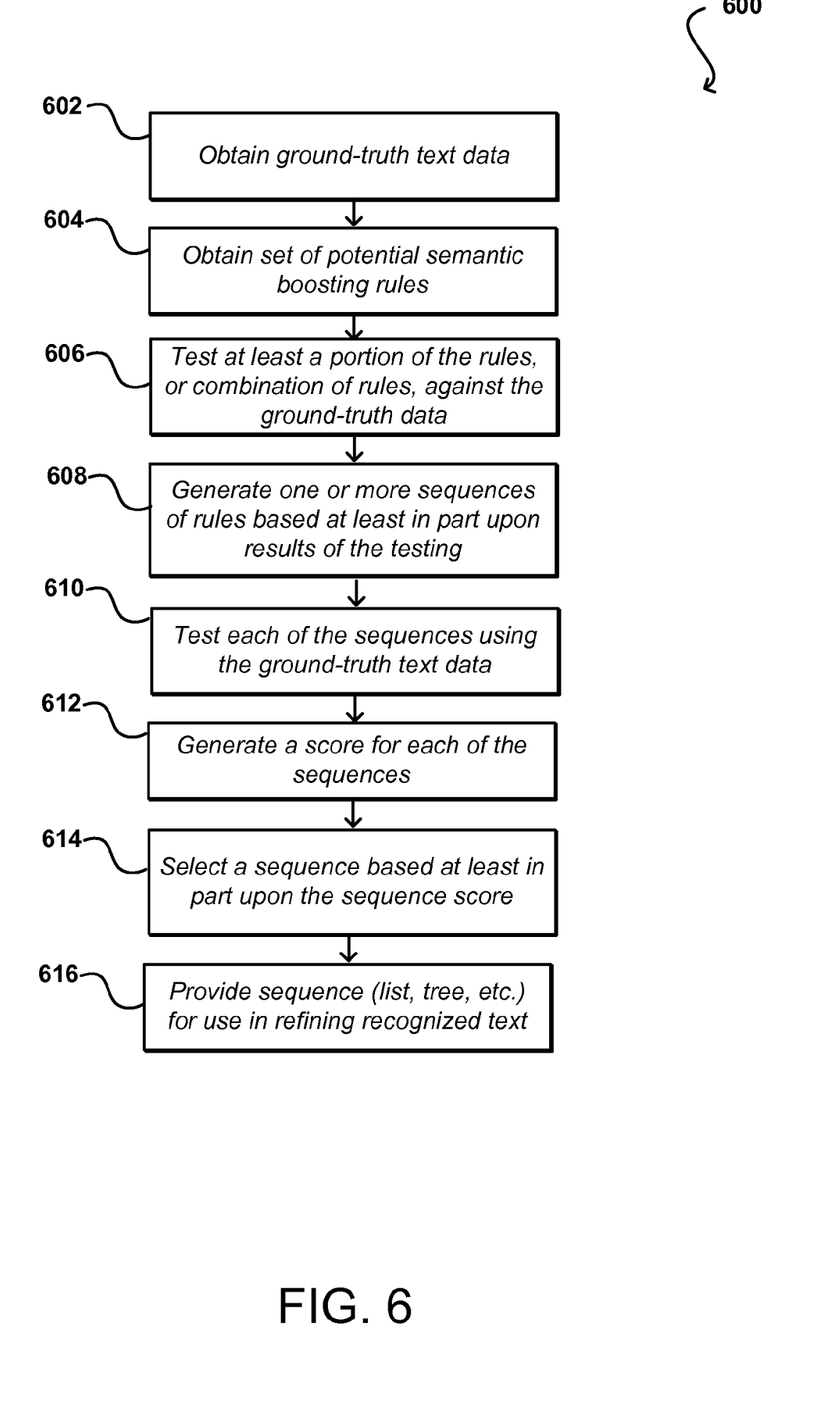
FIG. 6 illustrates an example process for building a refinement rule decision tree that can be used in accordance with various embodiments.

FIG. 6 illustrates an example process 600 for generating a decision tree for use in an environment such as that illustrated in FIG. 5. It should be understood that there can be additional, fewer, or alternative steps performed in similar or alternative orders, or in parallel, within the scope of the various embodiments unless otherwise stated. In this example, a set of ground-truth text data is obtained 602. As discussed, the ground-truth text data can include known strings of input text, as well as the results (including confidence values or other such information) produced by a text recognition process. A set of potential semantic boosting rules is also obtained 604. As discussed, a semantic boosting rule can utilize semantic information, such as acceptable text patterns, data sources, and related information, to identify imperfections in text strings and suggest proper corrections. A boosting rule can be considered as a transparent filter: it takes the output from the text recognition process and provides a refined version of the output. A semantic boosting rule can take a bubble graph as input and return the same, or a similar, bubble graph with modified character-level confidence for one or more positions.

At least a portion of the semantic boosting rules, or combinations of the rules, can be tested 606 against the ground-truth data. In at least some embodiments, a data-driven rule database optimization can be applied to select the most useful and/or relevant rules. In some embodiments, a performance, relevance, or other such rule score is defined for each rule, and the rules with the highest scores can be applied first. A rule score in at least one embodiment consists of factors such as the frequency or likelihood that the precondition of a rule will occur, and the respective true positive and/or true negative rate of the precondition, as well as how accurately the precondition can be detected. Other factors that can be considered include the cost of mistakes, such as the cost of missing the applicable text and/or making incorrect changes, as well as the complexity of the rule (e.g., space and time complexity) and the compatibility of the rules, such as whether any of the rules conflict with each other. One or more sequences of rules can be generated 608 based at least in part upon the results of the rule testing. For example, a sequence might be generated with all rules sorted by rule score. Other sequences might be generated as well, such as decision trees with branches based on factors such as pre-conditions, lists selected based upon performance with respect to certain types of text data, sets of randomly or dynamically ordered rules, etc. Rules can be selected for sequences based on various criteria, such as the rule having at least a minimum rule score in at least some embodiments.

One embodiment of rule optimization involves sorting the selected rules in descending order by rule score, with the most important rules having the highest rules scores being applied first. In some embodiments the sorting or ordering can involve a decision tree, which can have one or more branches for potentially conflicting rules, where information such as the pre-conditions are used to determine whether to apply the rule at each node, and the ordering of the nodes is determined by the rule scores of the selected rules. In some embodiments, a machine learning approach can be used to train a random forest classifier, where each "tree" in this forest is a rule, based on the ground-truth data. The classifier can integrate the information from multiple rules and weight them proportionally according to their respective rule scores. In other embodiments, randomly shuffled lists of rules can be selected and tested to determine which set and ordering generates the best accuracy.

At least a portion of the generated sequences can be tested 610 using the ground truth data, or a subset of the ground-truth data (as may comprise bubble graphs), as well as any other appropriate information. As mentioned above, a data-driven rule database optimization can be applied to attempt to determine the most useful and/or relevant sequence. In at least some embodiments, a sequence score is generated 612 for each tested sequence. A sequence score can be determined using factors such as how accurately the sequence produces refinements for different types of text. Other factors that can be considered include the cost of mistakes, such as the cost of missing the applicable text and/or making incorrect changes, as well as the complexity of the sequence, etc. Once the sequence scores have been generated, at least one sequence can be selected 614 based at least in part upon the sequence scores, such as by selecting the sequence with the highest score. The selected sequence(s) then can be provided 616 for use in refining recognized text.

As mentioned, there can be various types of semantic boosting rules that are considered and/or tested by the optimization engine, or another such component, service, or process. One example is a rule for pattern-based validation. There can be several customary rules that are applicable to actionable text, among other types of text. For example, the phone numbers in North America have the general form xxx-xxx-xxxx, although variations exist. One or multiple regular expressions can be utilized to represent these phone numbers. Similar rules can be applied to email addresses and web domains, among others. As discussed with respect to FIG. 3(*b*), a recognition that a text string corresponds to a URL or email address can indicate that the string more likely ends in ".com" than ".corn" or ".con", for example. Another type of semantic boosting rule utilizes database validation of single actionable text. A significant percentage of actionable text content can be found in a certain registry or database. For example, all the top level domains (TLD) are saved in the ICANN accredited registrar databases. A communication with a domain name can be sent to the DNS server and verify its correctness. One can also build a search algorithm to obtain a suggested alternative if the domain name is not there. Such information can also utilize popular email domains, website rankings, area codes, customer names, and other such data to attempt to find a match for one of the alternatives and improve the appropriate confidence value(s). Data sets or information sources that can be examined can include, for example, sources of linguistic knowledge (e.g., an online dictionary), customary rules (e.g., phone number or email patterns), and factual information (e.g., phone books or domain name registries). These sets can form a set of domain-specific datasets that a regular OCR engine may be unable to access, and the set of available data sources is continually expanding and improving. In at least some embodiments, the data set used can be based at least in part upon the location of the user, past behavior of the user, preferences, historical data for other users, sensor data, or other such information that can help to narrow the field of search.

Other semantic boosting rules can take advantage of similar or other data sources to perform cross-referencing of multiple text items, actionable or otherwise. For example, if the text recognition process has produced an actionable text instance with confidence, at least some of the data sources can be searched to attempt to find at least one cross reference of the text string that is being refined. For example, if a processed image produces both a phone number and an email address, the phone number can be used to search data sources to determine if the correct email address is stored in those data sources and associated with the phone number. If so, there is a level of confidence that both actionable texts are correct. Each of these semantic boosting rules can have a potential accuracy improvement associated with data such as computation complexity, false positive rates, etc.

Figure 7:
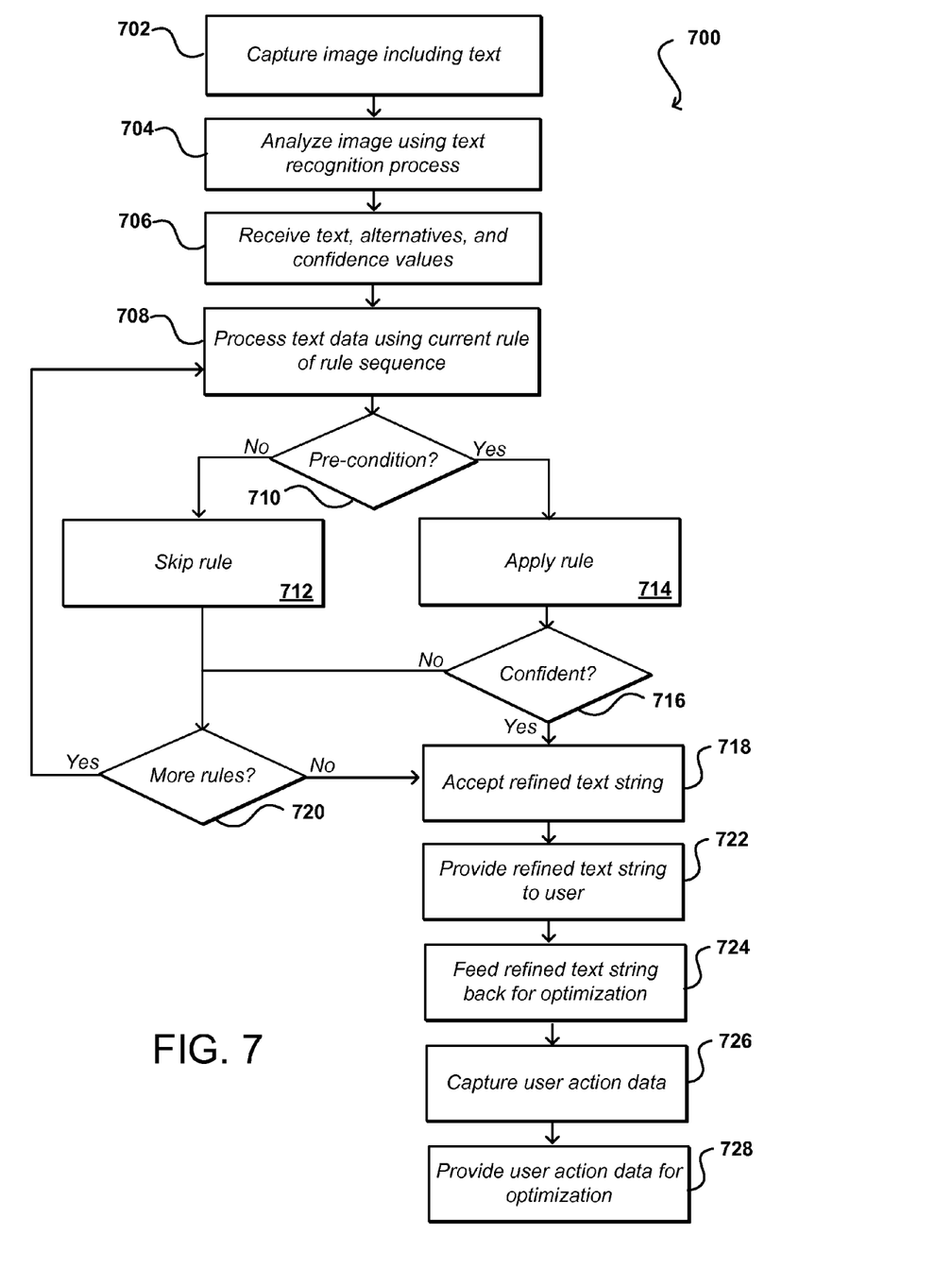
FIG. 7 illustrates an example process for using a decision tree to refine the bubble graph for an instance of recognized text that can be used in accordance with various embodiments.

FIG. 7 illustrates an example process 700 for applying these rules once the rules are selected and structured, that can be used in accordance with various embodiments. While this example is discussed with respect to an image captured by a user using a camera of a computing device, it should be understood that images to be analyzed can be obtained in a number of different ways. In this example, an image is captured 702 using a camera of a computing device. The image is analyzed 704 using at least one text recognition process, as may utilize an OCR engine, and at least one text string, bubble graph, or other text data can be received 706 for any text recognized from the image. As discussed, the data can include alternates and confidences for one or more character locations in the text where there is less than a minimum level of confidence in all characters of the result, or another such criterion is met. In this example, the text is processed 708 using a semantic boosting rule sequence, such as by starting with a first rule of the sequence and then moving to additional rules of the sequence. Other approaches can be used as well, such as traversing the branches or nodes of a decision tree, randomly selecting rules of a set, using a linear regression tree, random forest, or boosted classifiers-based approach, etc. Other sets or organized collections of rules can be used as well as discussed elsewhere herein. For a given node while testing the rules of the set or sequence, a determination 710 is made as to whether the pre-conditions for a current rule are satisfied. If not, the rule is skipped 712. If any pre-conditions are satisfied, the rule is applied 714. A determination 716 is made as to whether the confidence for each character position at least meets a minimum confidence threshold. If so, the result can be accepted 718 as the refined text string. If not, a determination 720 can be made as to whether there are more rules in the tree to be applied. If so, the process can continue. If not, the final result can be accepted as the refined string. The result can be provided 722 to the user as actionable text, for example, and the result (and any user interaction with the result) can be fed back 724 into the optimization engine to optimize the decision tree for future refinements. In at least some embodiments, user action data with respect to the refined text can be captured 726, such as by monitoring whether the user accepts and/or performs an action with the refined text, or whether the user attempts to correct the refined text or redo the recognition process. At least a portion of the user action data then can be provided 728 for use in the optimization process, using the actual user action data to improve results of the refinement process by updating sequence scores, selecting different rule sequences, etc.

In some cases it may not be possible to generate a result with an acceptable overall confidence value, or set of individual confidence values. In at least some embodiments, the user can be presented with two or more options from which to select. For example, the refinement process might produce ten possible alternatives for a given input text string. The software might show a number of options, such as the three options with the highest confidence scores, or the options with above a minimum confidence score, such as options with at least a 0.3 confidence score, among other such options. The user can then select the one that is appropriate, or enter the correct text. In some embodiments, the software might display the text with the highest confidence value, but indicate graphically that other options exist from which the user can select. Various other options can be used as well.

In order to prevent the refinements from going too far from the original text, various rules, limits, or safeguards can be put into place. For example, there might be a maximum number of characters that can be added, removed, or changed, or a maximum difference for a substitution of another word, among other such options. An assumption can be made that the text recognition process was relatively accurate, otherwise the refinement process may not be able to improve the recognized text through refinement of the recognized text.

Figure 8:
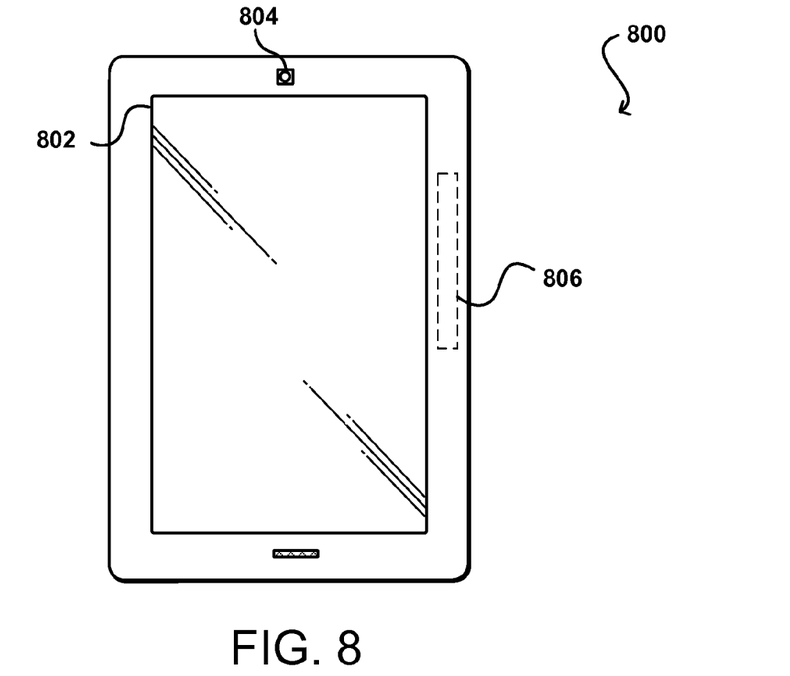
FIG. 8 illustrates an example device that can be used to implement aspects of the various embodiments.

FIG. 8 illustrates an example electronic user device 800 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 800 has a display screen 802 on the front side, which under normal operation will display information to a user facing the display screen (e.g., on the same side of the computing device as the display screen). The computing device in this example includes at least one camera 804 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

Figure 9:
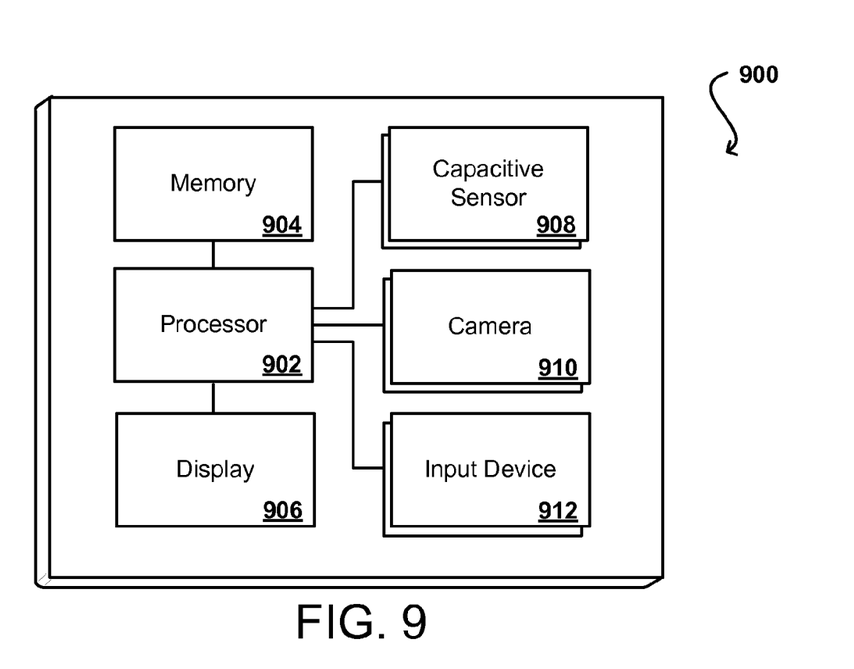
FIG. 9 example components of a client device such as that illustrated in FIG. 8.

FIG. 9 illustrates a logical arrangement of a set of general components of an example computing device 900 such as the device 800 described with respect to FIG. 8. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one camera 910 or other image capture element that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The device also can include a capacitive sensor 908 or other such input mechanism for enabling the user to provide input by contacting a location on a display screen or other such element.

In some embodiments, the computing device can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device 912 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

Figure 10:
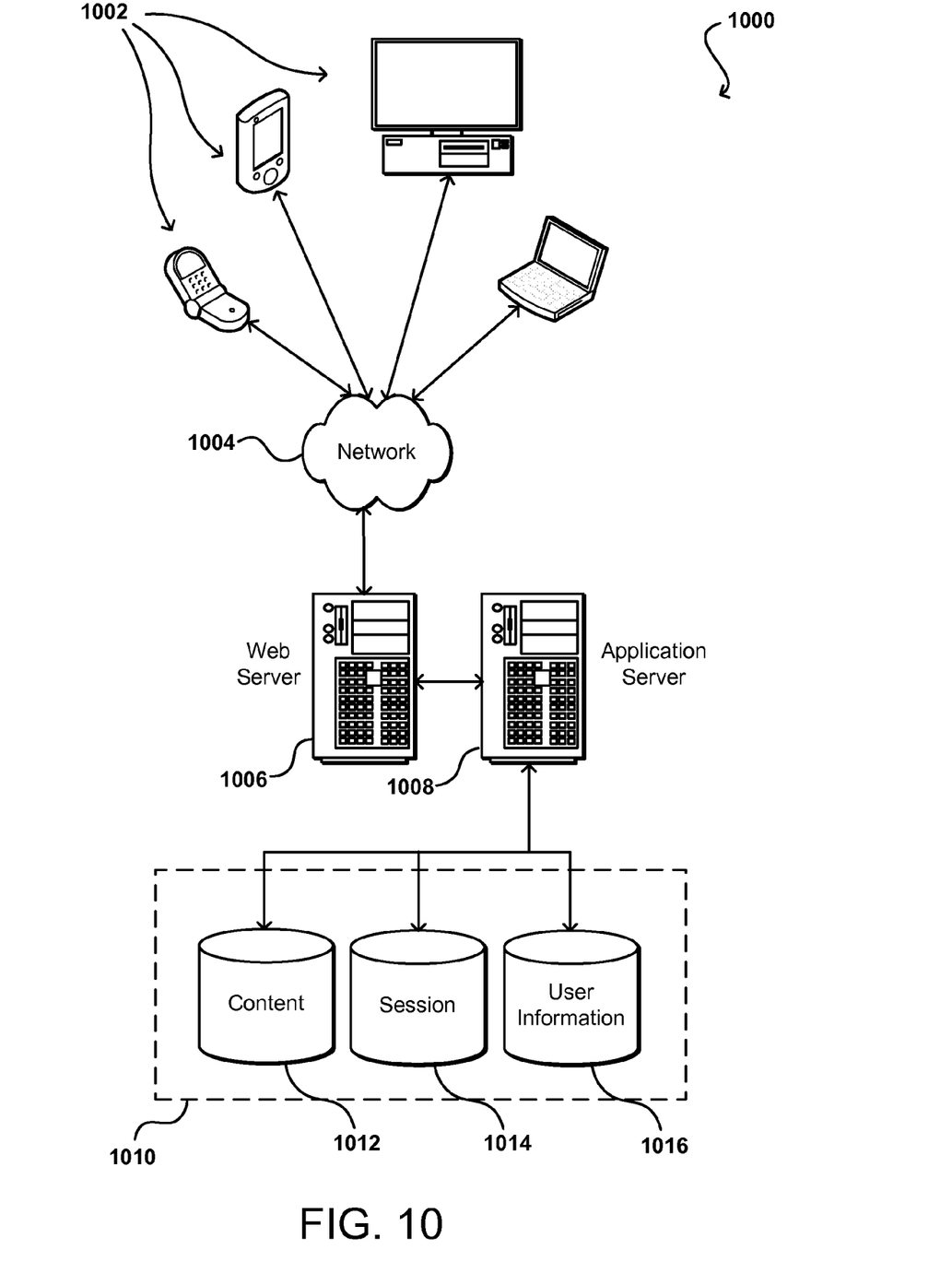
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 1002. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

Figure 11:
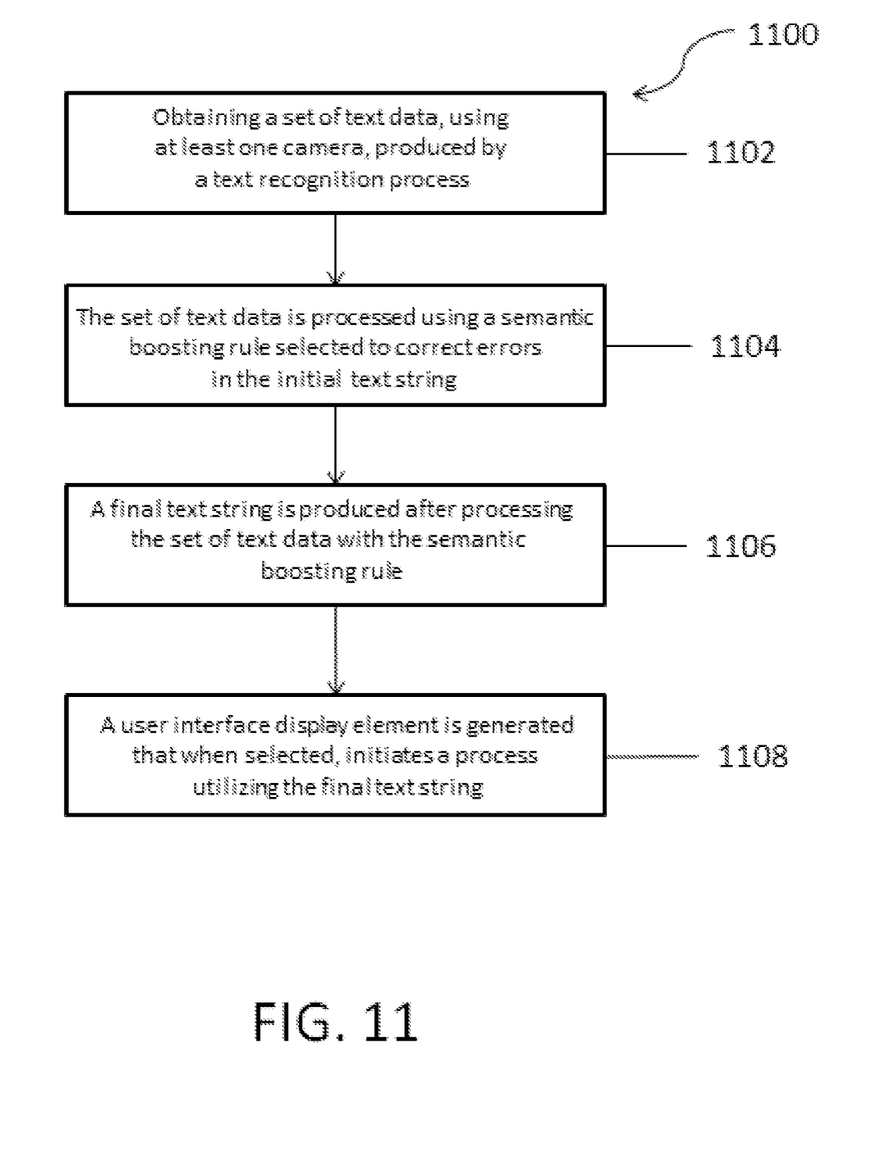
FIG. 11 illustrates an example process for using a decision tree to refine the bubble graph for an instance of recognized text that can be used in accordance with various embodiments.

FIG. 11 illustrates an example process 1100 for applying these rules once the rules are selected and structured, that can be used in accordance with various embodiments. While this example is discussed with respect to an image captured by a user using a camera of a computing device, it should be understood that images to be analyzed can be obtained in a number of different ways. In this example, a set of text data 1102, is obtained using at least one camera, produced by a text recognition process. The set of text data 1104 is processed using a semantic boosting rule selected to correct errors in the initial text string. A final text string 1106 is produced after processing the set of text data with the semantic boosting rule. A user interface display element 1108 is generated that when selected, initiates a process utilizing the final text string.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory device including instructions that, when executed by the at least one processor, cause the system to:
   obtain an image including text;
   process the image with a text recognition algorithm to produce text string data, the text string data including at least two options for at least one portion of the text string, each of the at least two options having a respective confidence value;
   process the text string data using a rule decision tree, the rule decision tree including a plurality of hierarchical nodes, at least a portion of the hierarchical nodes corresponding to a respective semantic boosting rule, wherein processing the text string using the decision tree includes, for at least one node of the nodes in the decision tree:

determine that a pre-condition is satisfied for the semantic boosting rule, for a first node of the decision tree, with respect to the text string;

apply the semantic boosting rule for the first node to the text string in response to determining that the pre-condition is satisfied, the applying of the semantic boosting rule causing in at least one confidence value for the text string to be adjusted and a refined version of the text string to be generated; and upon receiving the refined version of the text string, provide the refined version as recognized text for the image.

2. The system of claim 1, wherein the instructions when executed further cause the system to:

determine that the text string is the refined version in response to at least one of an overall confidence value for the text string data being equal to, or greater than, a minimum confidence value or each applicable rule of the decision tree being applied to the text string data.

3. The system of claim 1, wherein the instructions when executed further cause the system to:

determine that at least the refined version of the text string corresponds to actionable text; and present an interface element that, when selected, initiates a process for performing an action associated with the actionable text.

4. The system of claim 1, wherein the semantic boosting rule for the first node includes at least one of a pattern recognition rule, a data source lookup rule, a contextual rule, a behavioral rule, a proximity rule, or a cross-reference rule.

5. A method, comprising:

obtaining an image including text;

processing the image with a text recognition algorithm to produce text string data, the text string data including a first option for a first portion of the text string and a second option for the first portion, the first option having a first confidence value and the second option having a second confidence value;

processing the text string data using a rule decision tree that has a plurality of hierarchical nodes, including a first hierarchical node corresponding to a semantic boosting rule, wherein processing the text string using the rule decision tree includes, for at least the first hierarchical node:

determining that a pre-condition is satisfied for the semantic boosting rule with respect to the text string;

applying the semantic boosting rule to the text string in response to determining that the pre-condition is satisfied, the applying of the semantic boosting rule causing at least one of the first confidence value or the second confidence value to generate a refined text string; and providing the refined text string as recognized text for the image.

6. The method of claim 5, further comprising:

determining that the text string is the refined text string in response to at least one of an overall confidence value for the text string data being equal to, or greater than, a minimum confidence value or each applicable rule of the decision tree being applied to the text string data.

7. The method of claim 5, further comprising:

determining that at least the refined text string corresponds to actionable text; and presenting an interface element that, when selected, initiates a process for performing an action associated with the actionable text.

8. The method of claim 5, wherein the semantic boosting rule for the first node includes at least one of a pattern recognition rule, a data source lookup rule, a contextual rule, a behavioral rule, a proximity rule, or a cross-reference rule.

\* \* \* \* \*